United States Patent [19]

Monchil

[11] 3,950,882
[45] Apr. 20, 1976

[54] FIXED BILL FISHING LURE

[76] Inventor: Donald L. Monchil, 12965 SW. 112 Ave., Miami, Fla. 33176

[22] Filed: Feb. 21, 1974

[21] Appl. No.: 444,646

[52] U.S. Cl. ............ 43/42.37; 43/42.23; 43/42.42
[51] Int. Cl.² ........................................ A01K 85/00
[58] Field of Search .............................. 43/42.08, 43/42.09, 42.11, 42.12, 42.14, 42.16, 42.17, 42.22, 42.31, 42.35, 42.39, 42.45, 42.46, 42.47, 42.49, 43.1, 43.13, 43.14, 43.16, 44.85, 44.87, 44.92, 44.94, 44.98, 42.4

[56] References Cited
UNITED STATES PATENTS

| | | | |
|---|---|---|---|
| 1,233,507 | 7/1917 | Reynolds | 43/42.47 |
| 1,341,618 | 5/1920 | Medley | 43/42.47 |
| 1,615,803 | 1/1927 | Pflueger | 43/42.4 |
| 2,217,789 | 10/1940 | Bobo | 43/42.44 |
| 2,503,369 | 4/1950 | Wycech | 43/42.42 |
| 2,602,256 | 7/1952 | Master et al. | 43/42.44 |
| 2,604,716 | 7/1952 | Hair | 43/42.09 |
| 2,700,843 | 2/1955 | Werner | 43/44.98 |
| 3,152,419 | 10/1964 | Jones | 43/42.23 |
| 3,568,351 | 3/1971 | Perrin | 43/42.31 X |
| 3,628,276 | 12/1971 | Coalson | 43/42.23 |
| D161,820 | 2/1951 | Brooks | 43/42.47 X |

Primary Examiner—Louis G. Mancene
Assistant Examiner—Peter K. Skiff
Attorney, Agent, or Firm—Robert E. Massa

[57] ABSTRACT

A fishing lure is formed of a body and a bill attached at the forward end of the body. The bill includes a major portion adjacent the body and inclined downwardly in relation to the longitudinal axis of the body. The major portion terminates forwardly in a minor portion further inclined downwardly in relation to the major portion. Hook means are carried by the body, and a skid arcuately connects a lower portion of the body and the minor portion or leading edge of the bill to facilitate movement of the lure over obstacles.

9 Claims, 26 Drawing Figures

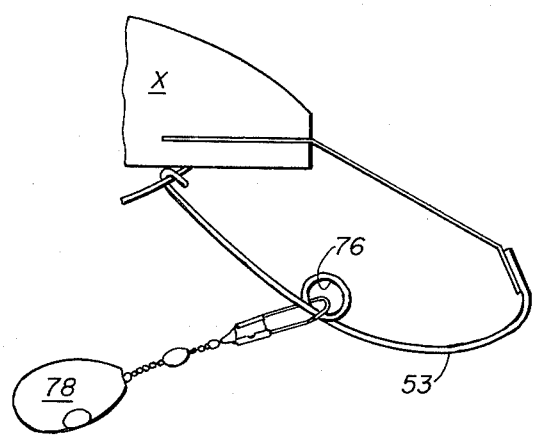
Fig. 12.
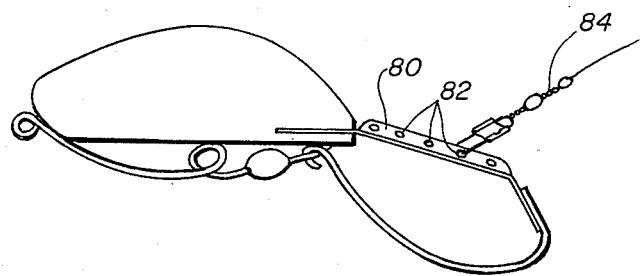
Fig. 13.
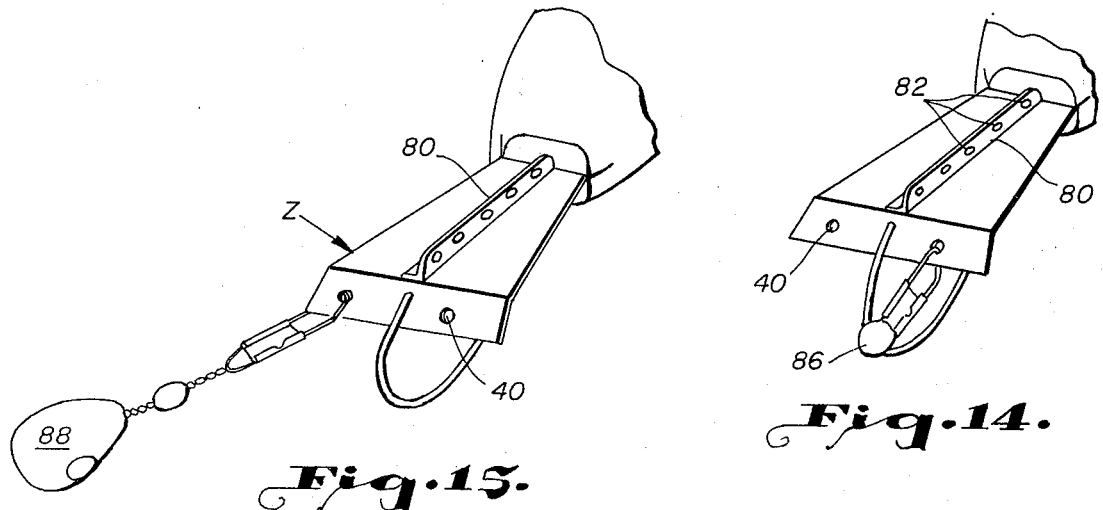
Fig. 14.
Fig. 15.

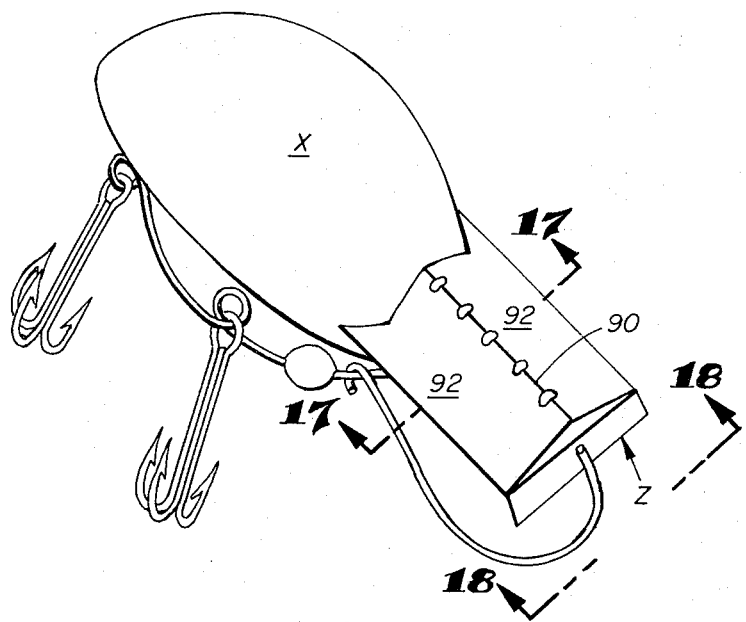
Fig.16.
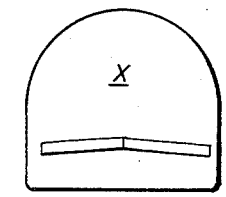
Fig.17.
Fig.18.
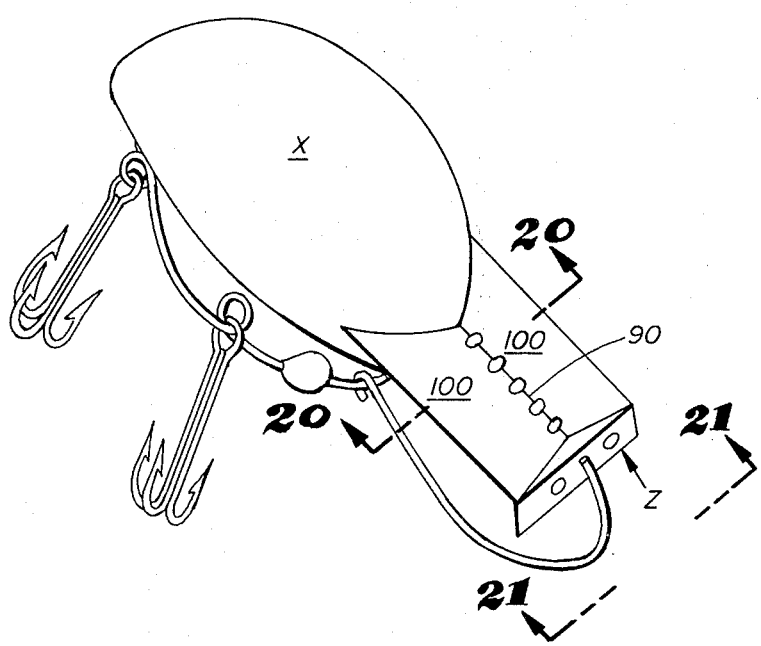
Fig.19.
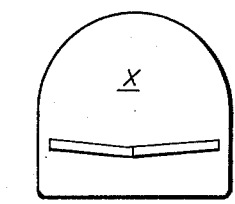
Fig.20.
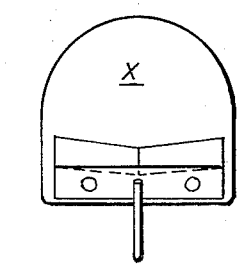
Fig.21.

AT REST • IN MOTION

B > W
Center of gravity
submerges bill
when lure at rest

WHERE:
$\alpha + g + h = 90$
$h = (90 - g) - \alpha$

BODY MOMENT IS A
FUNCTION OF $(\sin \alpha + \cos \alpha)$

BILL MOMENT IS A
FUNCTION OF $\sin \alpha$

FIXED BILL FISHING LURE

BACKGROUND OF THE INVENTION

The present invention relates to fishing lures formed with a body and a substantially rigidly connected bill as distinguished from lures wherein the body and bill are hinged or otherwise movably connected. Heretofore the bill has afforded limited control of the lure through the water imparting agitation to the body to simulate movement of live bait; it has not been possible to vary running depth of the lure since depth is primarily a function of the angular displacement of the body and bill, and they are fixedly connected or positioned.

OBJECTS OF THE INVENTION

A principal object of the invention is to provide a fishing lure with means for selectively determining running depth.

Another object resides in the provision of a means to control forces or moments on the bill effecting frequency of agitation of the lure. In this connection weight can be selectively added and positioned to further vary these forces and consequent range of agitation.

Another object and feature resides in a skid member arcuately disposed from the leading edge of the lure to reduce or obviate entanglement with objects in the path of the lure.

Still another object is the audible noise, enhancing the invention as a lure, resulting from impact of forces on the diaphragm defined by the thin sheet metal composition of the bill. Attachment of the skid to the leading edge of the bill amplifies this audible vibration when the skid strikes an object.

These and other objects and advantages of the invention will be appreciated upon reading the following description in conjunction with the accompanying drawings.

BRIEF DESCRIPTION OF THE DRAWINGS

FIG. 12 is a partial side view of a fifth embodiment wherein the skid is centrally looped to receive an optional attachment.

FIGS. 13 – 15, with optionally positioned attachments, illustrate side and partial perspective views of a sixth embodiment.

FIG. 16 is a perspective view of a seventh embodiment; and FIGS. 17 and 18 are views taken substantially on corresponding lines 17 — 17 and 18 — 18 of FIG. 16.

FIG. 19 is a perspective view of an eighth embodiment; and FIGS. 20 and 21 are views taken substantially on corresponding lines 20 — 20 and 21 — 21 of FIG. 19.

DESCRIPTION OF THE PREFERRED EMBODIMENTS

Throughout the drawings the body of the lure is referred to generally as X and the bill as Z.

Figure 1:
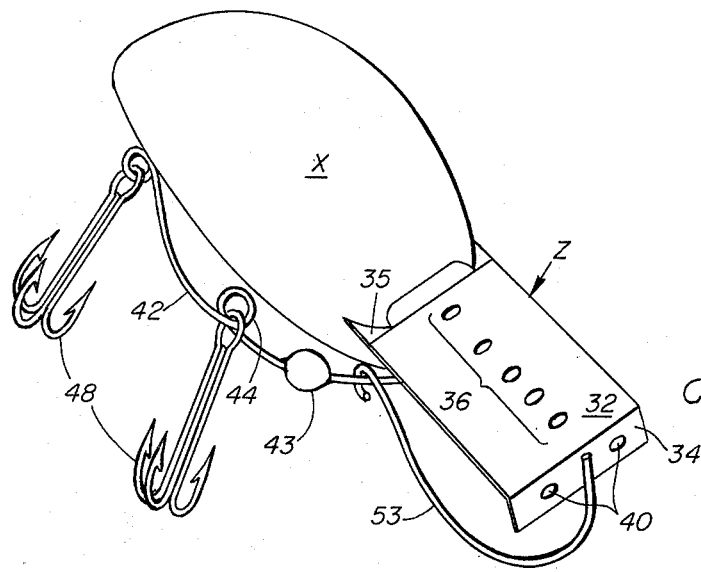
FIGS. 1 – 5 illustrate, with various attachments, a first embodiment of the invention shown respectively in perspective, side, plan, front and partial side views.
Figures 2, 5:
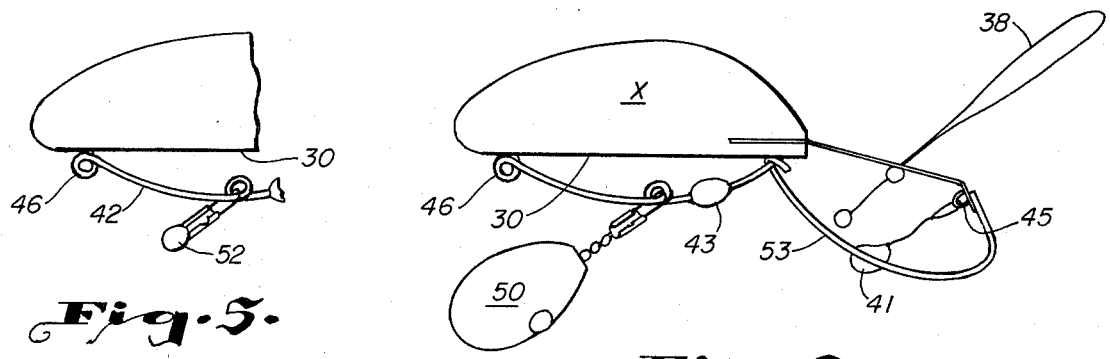
Figure 3:
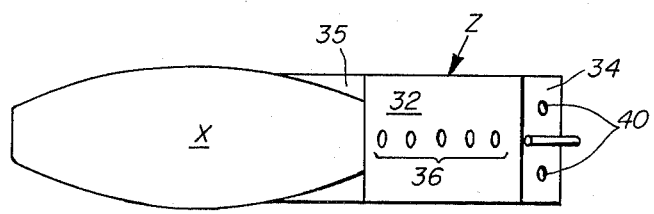
Figure 4:
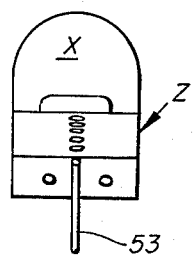

In the embodiment of FIGS. 1 through 5 body X is shown as a streamlined member flattened on the undersurface 30. Bill Z comprises a major portion 32 inclined downwardly in relation to the longitudinal axis of body X and terminates forwardly in a minor portion or leading edge 34 depending obliquely from major portion 32. The bill and body are joined by a third portion or upper tab 35 defining lateral flanges from the body and increasing projected bill area. Holes 36 in the major portion or diaphragm 32 of bill Z are provided for selective attachment of a leader 38 (FIG. 2), and holes 40 in minor portion 34 may receive optional attachments. In FIG. 2 a weight 41 is carried by an eye 45.

A rail 42 arcuately suspended under body X carries a fixed weight 43 and is formed with central and rearward loops or eyes 44 and 46 to optionally receive hooks 48 (FIG. 1), a flasher 50 (FIG. 2) or a weight 52 (FIG. 5). A skid 53 extending arcuately from leading edge 34 to rail 42 assists the lure over obstacles.

Figure 7:
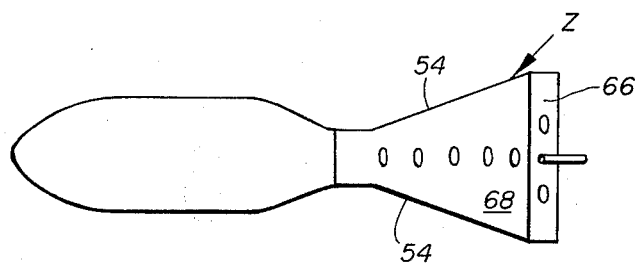
FIGS. 6 and 7 are side and plan views of a second embodiment.
Figure 6:
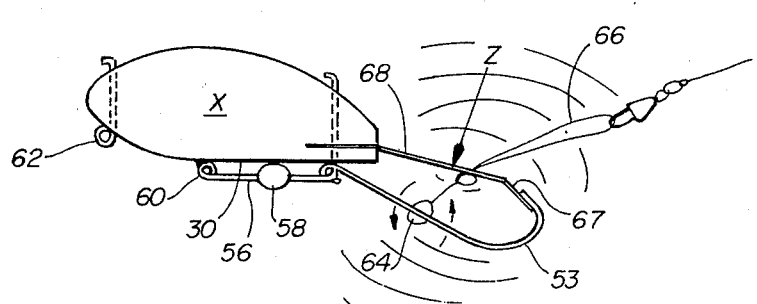

The embodiment of FIGS. 6 and 7 widens edges 54 forwardly of bill Z to define substantially a truncated triangle in plan (FIG. 7). Rail 56 has been raised to juxtapose weight 58 against undersurface 30 of body X, and a single eye 60 is located on rail 56 to receive an optional attachment centrally of the body. A second eye 62 is located to the rear. A metallic member 64 is freely carried by the leader 66 and positioned to knock or beat against skid 53 or bill Z to produce audible vibration. Member 64 should be steel, brass or other conductive metal; a lead weight deadens the audible effect. The audible impulse of the beat against skid 53 is transmitted through skid 53 and leading edge 67 to major portion 68 of bill Z which, being of thin metallic construction, responds like a diaphragm to the impulse.

Figure 8:
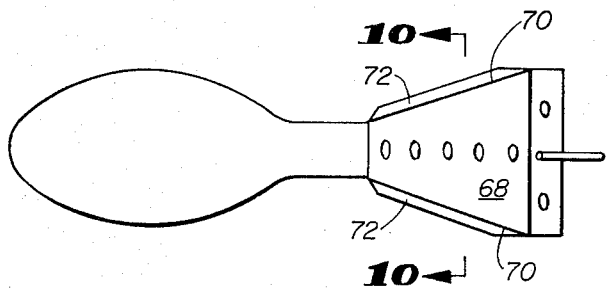
FIGS. 8 and 9 are plan and side views of a third embodiment.
Figure 10:
FIG. 10 is a view taken substantially on line 10 — 10 of FIG. 8.
Figure 9:
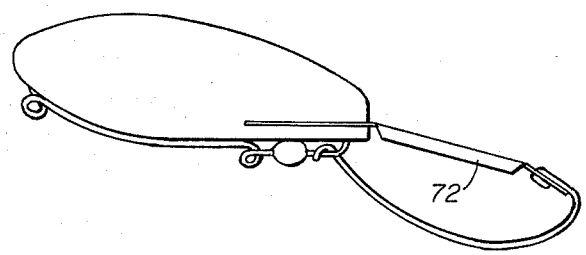

In the embodiment of FIGS. 8 – 10 major portion 68 of bill Z is bent laterally along bend lines 70 to form downwardly disposed tabs 72. Tabs 72 serve as ribs to stiffen major portion 68 and enhance the diaphragm sensitivity to audible impulse; by decreasing bill area opposed to forward movement in the water the tabs also modify bill eccentricity and consequent agitation of the lure.

Figure 11:
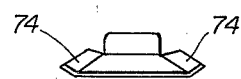
FIG. 11 is a view similar to FIG. 10 but showing a fourth embodiment wherein the side tabs are upwardly disposed.

In FIG. 11 side tabs 74 are disposed upwardly; this increases agitation of the moving lure.

Skid 53 of FIG. 12 is formed with an eye 76 to receive an optional attachment, shown as a flasher 78.

In FIGS. 13 – 15 major portion 68 of bill Z is symmetrically or longitudinally bisected by an upstanding or L-shaped member 80 perforated with holes 82 for selective attachment of of line 84. Holes 40 in leading edge 34 may optionally receive a weight 86 (FIG. 14) or flasher 88 (FIG. 15). Since holes 40 are spaced laterally, the attachment, in addition to its usual function, affects eccentricity of the bill and agitation of the lure.

In FIGS. 16 – 18 bill Z is bent along a longitudinal line of symmetry 90 to define downwardly disposed sides 92. Similar to downwardly disposed tabs 72 of FIGS. 8 – 10, sides 92 decrease agitation of the moving lure.

In FIGS. 19 – 21, sides 100 are upwardly disposed along symmetrical line 90, increasing agitation.

Figure 22:
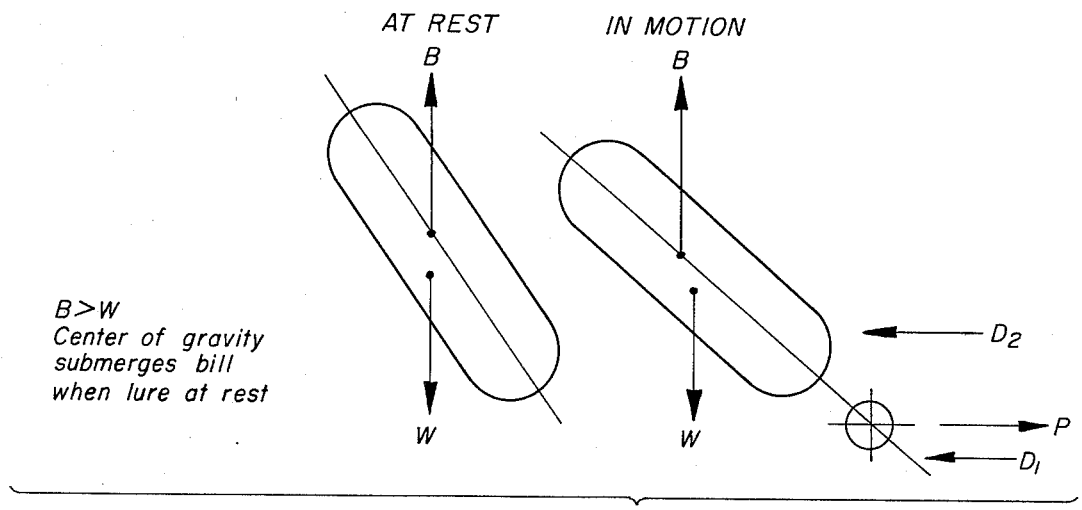
FIG. 22 diagramatically analyzes the forces about the pivotal point of attachment to the leader (P) where buoyancy (B) of the lure exceeds and is located rearwardly of its weight (W), and also shows the lure at rest.

FIG. 22 diagrammatically sets forth the lure at rest and in motion. In the preferred embodiment buoyancy (B) of the lure exceeds weight (W) and these forces are located to position the center of gravity of the lure proximate the joinder of the body and bill such that at rest the lure normally floats with the bill submerged. As illustrated, these forces of buoyancy and weight are vertically aligned with the lure at rest; as shown to the right, in motion the lower and upper bill forces ($D_1$ and $D_2$) resulting from pull (P) at point of attachment to the leader displace vertical alignment of forces B and W to effect the agitated, simulated live bait action of the lure.

Figure 23:
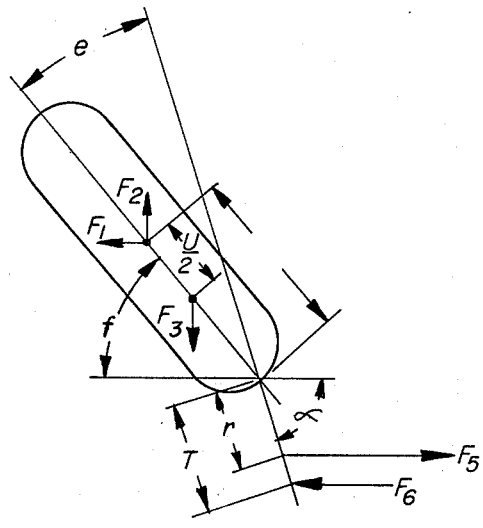
FIG. 23 diagrams the forces upon a lure in motion where the bill depends acutely from the longitudinal axis of the body.
Figure 24:
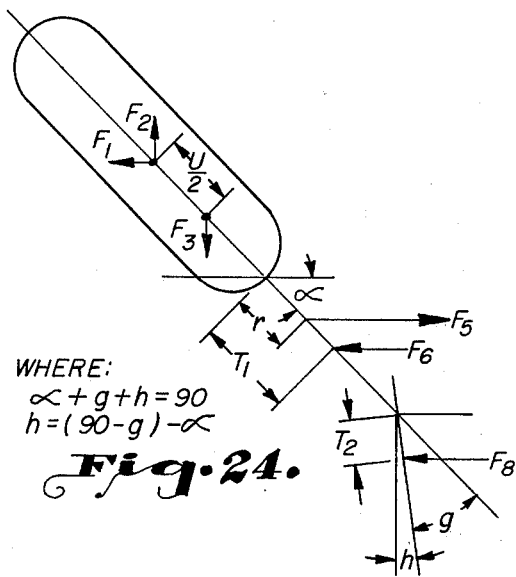
FIG. 24 diagrams the forces on a lure having a compound bill with a downwardly bent leading edge.

FIG. 23 diagrams the forces upon a lure in motion where the bill depends acutely from the longitudinal axis of the body at angle $e$. FIG. 24 diagrams the forces on a lure with a straight bill having the leading edge bent downwardly at angle $g$. The forces represented by the symbols are as follows:

$F_1$ = body drag
$F_2$ = buoyant force
$F_3$ = weight
$F_5$ = pull
$F_6$ = bill force at bill centroid
$F_8$ = force at centroid of downwardly bent leading edge
T and $T_1$ = bill or bill section centroid
$T_2$ = downwardly bent leading edge centroid
$r$ = $F_5$ position or pull
U = $F_2$ location or buoyancy
U/2 = location of buoyancy and weight
$\alpha$, (alpha), = angle displacement from horizonal (water line)

FIGS. 23 and 24 omit the vertical components of $F_1$ (body drag), $F_5$ (pull) and $F_6$ (force at bill centroid).

In the following analysis of forces at work on the lure, body drag ($F_1$) is broken into components of body projected area ($A_1$), body drag coefficient ($C_1$) and dynamic pressure (Q). Different subaltern numbers indicate modifications in projected body area and consequent drag coefficient. Thus, $F_1 = A_1 C_1 Q$ and $F_6 = A_6 C_6 Q$.

In FIG. 23, if $A_2$=body projected area when $f$=0, then $A_1 = A_2 + A_2 \sin f$, and $F_1 = A_2(1 + \sin f) C_1 Q$ If $A_7$=bill projected area when $\alpha$=90, then $A_6 = A_7 \sin \alpha$, and $F_6 = A_7 \sin \alpha C_6 Q$ At a given instant, $\Sigma M = 0$, where M is moment
Assume forces horizontal and vertical as shown
$F_1 (U \sin f + r \sin \alpha) + F_3 (U/2 \cos f + r \cos \alpha)$
$= F_2(U \cos f + r \cos \alpha) + F_6(T-r) \sin \alpha$ Let $F_2 = F_3$ and let $F_2 = nF_1$ then
$F_1(U \sin f + r \sin \alpha) + nF_1(U/2\cos f + r \cos \alpha)$
$= nF_1(U \cos f + r \cos \alpha) + F_6(T-r) \sin \alpha$, or
$F_1(U \sin f + r \sin \alpha) + nF_1(U/2 \cos f + r \cos \alpha)$
$- nF_1(U \cos f + r \cos \alpha) = F_6(T-r) \sin \alpha$
Let $U = mT$ and $r = kT$
then, $F_1(U \sin f + r \sin \alpha) - nF_1 U/2 \cos f = F_6(T-r) \sin \alpha$ or,
$F_1(mT \sin f + kT \sin \alpha) - nF_1 mT/2 \cos f = F_6(T-kT) \sin \alpha$ or,
$F_1[(m \sin f + k \sin \alpha) - nm/2 \cos f] = F_6(1-k) \sin \alpha$ or, $$\frac{F_1 m \sin f}{\sin\alpha} + F_1 k - \frac{F_1 nm \cos f}{2 \sin\alpha} = F_6(1-k)$$

or, $$F_1 k + mF_1 \left( \frac{\sin f - n/2 \cos f}{\sin\alpha} \right) = F_6(1-k)$$

then, rearranging and factoring, this becomes what I designate as First Equation:

$$F_1 \left[ k + m \left( \frac{\sin f - n/2 \cos f}{\sin\alpha} \right) \right] = F_6(1-k)$$

If $e = 0$, bill angle = 0, and $f = \alpha$, then First Equation becomes what I designate as Second Equation:

$F_1[k + m(1-n/2 \cot\alpha)] = F_6(1-k)$

Assume $C_1 = C_6$, then, as stated above, $F_1 = A_2(1 + \sin f)C_1 Q$ and $F_6 = A_7 \sin\alpha C_6 Q$ and by substituting, we have $A_2(1 + \sin f)C_1 Q[k + m(1-n/2 \cot\alpha)] = A_7 \sin\alpha C_6 Q$
or
$A_2(1 + \sin f)[k + m(1-n/2 \cot\alpha)] = A_7 \sin\alpha(1-k)$ Let $A_R$ = area ratio $A_2/A_7$, then we have what I designate as Third Equation:

$$A_R(1 + \sin f) \left[ k + m \left( \frac{\sin f - n/2 \cos f}{\sin\alpha} \right) \right] = \sin\alpha(1-k)$$

and from Second Equation, we have what I designate as Fourth Equation:

$A_R(1 + \sin\alpha)[k + m(1 - n/2 \cot\alpha)] = \sin\alpha(1 - k)$

In FIG. 24,
$F_1(U + r)\sin\alpha + F_3(U/2 + r)\cos\alpha = F_2(U + r)\cos\alpha + F_6(T_1-r)\sin\alpha + F_8[(T_1-r + T_1)\sin\alpha + T_2 \cos h]$, or
$F_1(U + r)\sin\alpha - F_2(U/2)\cos\alpha - F_8[(2T_1 - r)\sin\alpha + T_2 \cos h] = F_6(T_1 - r)\sin\alpha$
Let $T_2 = pT_1$, then
$F_1(m + k)\sin \alpha - F_2 m/2 \cos\alpha - F_8[(2 - k)\sin\alpha + p \cos h] = F_6(1 - k)\sin\alpha$, or
$F_1(m + k) - nF_1 m/2 \cot\alpha - F_8/\sin\alpha[(2 - k)\sin\alpha + p \cos h] = F_6(1 - k)$, or
$F_1(k + m(1-n/2 \cot\alpha)) - F_8/\sin\alpha [(2 - k)\sin\alpha + p \cos h] = F_6(1 - k)$
Let $A_8 = wA_2$, and substituting for $F_1$ and $F_8$ and $F_6$ $$A_2(1 + \sin\alpha)(k + m(1 - n/2 \cot\alpha)) - \frac{wA_2 \cos h}{\sin\alpha}[(2 - k)\sin\alpha + p \cos h] = A_7 \sin\alpha(1-k),$$

or substituting for $A_2$ and $A_7$ $$A_R\left[(1 + \sin\alpha)(k + m(1 - n/2 \cot\alpha)) - \frac{w \cos h}{\sin\alpha}((2 - k)\sin\alpha + p \cos h)\right] = \sin\alpha (1 - k)$$

then, this becomes what I designate as: Fifth Equation:

$$A_R\left[(1 + \sin\alpha)(k + m(1 - n/2 \cot\alpha)) - w \cos h(2 - k + \frac{p \cos h}{\sin\alpha})\right] = \sin\alpha(1 - k)$$

for compound bill, $e = 0$

Summary of bill equations where bill is straight, i.e., $e = 0°$:

Sixth equation:

$$A_R(1 + \sin\alpha)[k + m(1 - n/2 \cot\alpha)] = \sin\alpha(1 - k)$$

where: $0 < e < 90$

Seventh Equation:

$$A_R(1 + \sin f)\left[k + m \frac{(\sin f - n/2 \cos f)}{\sin\alpha}\right] = \sin\alpha (1-k)$$

For a compound bill where $e = 0$, we have

Eighth equation:

$$A_R\left[(1 + \sin\alpha)(k + m(1 - n/2 \cot\alpha)) - w \cos h (2-k + \frac{p \cos h}{\sin\alpha})\right] = \sin\alpha (1 - k)$$

where, $0 < e < 90$, Ninth equation:

$$A_R\left[(1 + \sin f) (k + m \frac{(\sin f - n/2 \cos f)}{\sin\alpha}) - w \cos h(2 - k + \frac{p \cos h}{\sin\alpha})\right] = \sin\alpha(1 - k)$$

For practical dimensions:
$m \approx 2$
$n \approx 1/6$
$p \approx 1/3$
$w \approx 1/4$ The largest error is the expression of $F_2$ and $F_3$ as a ratio ($n$) of $F_1$ since $F_1$ varies with velocity. However, this appears acceptable at a given Q for such low velocities.

Figure 25:
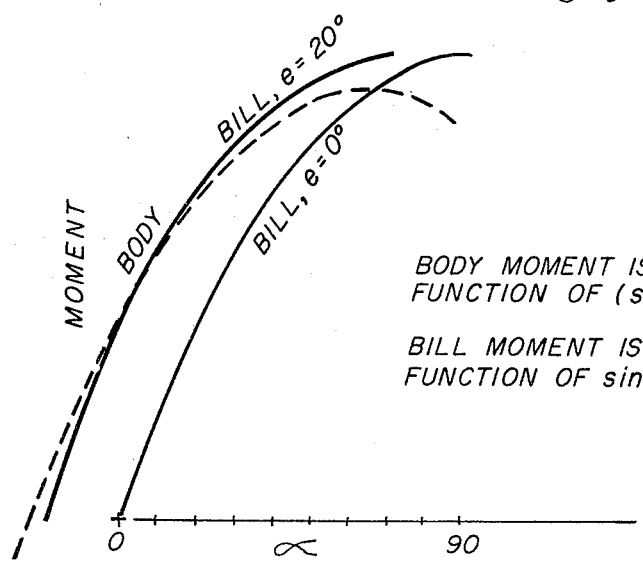
FIG. 25 graphically illustrates the correlation of bill and body moments at various angular displacements of the bill to the water; it shows the effect on a lure with a bill parallel to the axis of the body ($e=0°$) and also on a bill depending acutely from the body ($e=20°$).

FIG. 25 graphically diagrams bill moment (solid lines) and body moment (dotted line) of a lure having a straight bill ($e = 0°$) and a bill depending 20° from the body. It demonstrates the effect of angular displacement of the bill through 90°. With a straight bill it will be observed that body and bill moments are equal at a single angular displacement of the bill from horizontal. With the bill bent downwardly at 20°, bill and body moments match over a substantial range of bill displacements.

Figure 26:
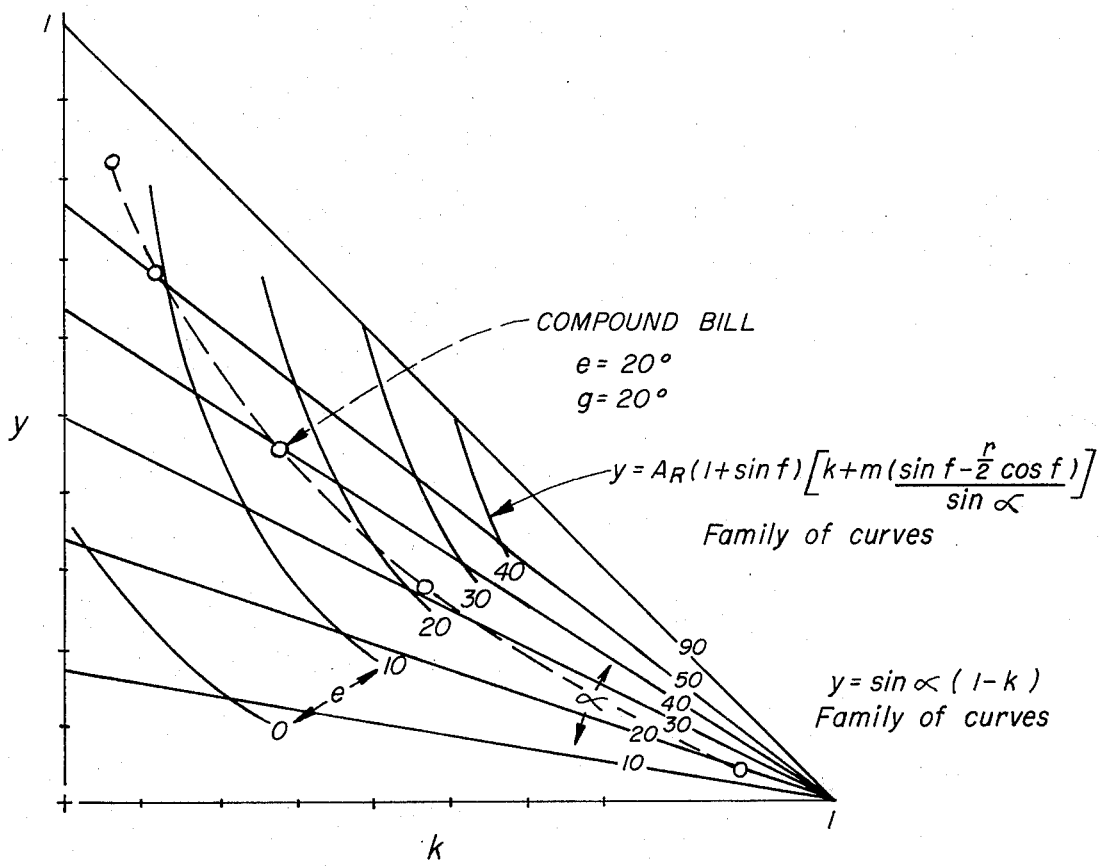
FIG. 26 graphically illustrates the effect of straight bill angles from 0° to 40° and also of a compound bill operating at angular displacement to the surface through 90°.

FIG. 26 graphically demonstrates the effect of bill angle (e) to the body ranging from 0° to 40° with the bill angularly displaced ($\alpha$) to the surface of the water through 90°. Based on the assumptions of the above equations, the optimum angle for a straight bill is about 10°. A better correlation is achieved by a compound bill (the curve in dotted line) with a bill angle (e) of 20° terminating in a minor portion downwardly disposed at 20° (g).

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A fishing lure including a buoyant body and a bill joined to one end of said body,
    said lure having a center of gravity proximate the joinder of the body and bill so that the lure normally floats with the bill submerged,
    said bill depending acutely from said body to define a planar diaphragm,
    a skid connected between a forward end of the bill and a lower portion of the body and extending arcuately below the bill and the body,
    means for selectively attaching a line to the bill, and hook means carried by said lure.

2. A fishing lure as described in claim 1, wherein:
    said diaphragm terminates forwardly of said body in a leading edge depending acutely therefrom.

3. A fishing lure as described in claim 1, wherein:
    said body includes a stability rail attached to the under portion thereof having a weight positioned thereon.

4. A fishing lure, comprising:
    a body,
    a bill attached to the body at a forward end thereof, said bill having
        a major portion adjacent the body inclined downwardly in relation to the longitudinal axis of the body, with means on said major portion for attachment of a line, and
        a minor portion adjacent a forward end of said major portion and inclined further downwardly in relation to said major portion,
    a skid connected between a forward end of the bill and a lower portion of the body and extending arcuately below the bill and the body, and
    means connected to the body for attachment of a hook.

5. A fishing lure as described in claim 4, wherein:

the body includes a stability rail attached to the under portion thereof having a weight positioned thereon.

6. A fishing lure as described in claim 5, wherein:
said major portion, in addition to being inclined downwardly in relation to the longitudinal axis of the body, has its planar halves disposed upwardly about a longitudinal axis of symmetry of the major portion.

7. A fishing lure as described in claim 5, wherein: said major portion, in addition to being inclined downwardly in relation to the longitudinal axis of the body, has its planar halves disposed downwardly about a longitudinal axis of symmetry of the major portion.

8. A fishing lure as described in claim 5, wherein:
said major portion includes upwardly disposed tabs along each side thereof.

9. A fishing lure as described in claim 5, wherein:
said major portion includes downwardly disposed tabs along each side thereof.

* * * * *